United States Patent

Koseki

(10) Patent No.: US 12,537,826 B2
(45) Date of Patent: Jan. 27, 2026

(54) ATTACK DETECTION DEVICE, ADVERSARIAL SAMPLE PATCH DETECTION SYSTEM, ATTACK DETECTION METHOD, AND NON-TRANSITORY COMPUTER READABLE MEDIUM

(71) Applicant: Mitsubishi Electric Corporation, Tokyo (JP)

(72) Inventor: Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 135 days.

(21) Appl. No.: 18/385,112

(22) Filed: Oct. 30, 2023

(65) Prior Publication Data

US 2024/0064157 A1 Feb. 22, 2024

Related U.S. Application Data

(63) Continuation of application No. PCT/JP2021/022916, filed on Jun. 16, 2021.

(51) Int. Cl.
*H04L 9/40* (2022.01)
*G06V 10/776* (2022.01)
*G06V 10/82* (2022.01)

(52) U.S. Cl.
CPC ........ *H04L 63/1408* (2013.01); *G06V 10/776* (2022.01); *G06V 10/82* (2022.01)

(58) Field of Classification Search
CPC ........ G06N 3/02; G06N 3/094; G06V 10/776; G06V 10/82; G06V 10/88; G06V 10/778;
(Continued)

(56) References Cited

U.S. PATENT DOCUMENTS 10,915,631 B2 * 2/2021 Chen ................. G06F 21/566
10,944,767 B2 * 3/2021 Goswami ........... H04L 63/1416
(Continued)

FOREIGN PATENT DOCUMENTS

JP 2015-230727 A 12/2015
JP 2019-8638 A 1/2019
(Continued)

OTHER PUBLICATIONS

German Office Action for German Application No. 112021007504.7, dated Aug. 27, 2024, with an English translation.
(Continued)

*Primary Examiner* — Hosuk Song
(74) *Attorney, Agent, or Firm* — Birch, Stewart, Kolasch & Birch, LLP

(57) ABSTRACT

An attack detection device (120) includes an anomalous pattern detection unit (123) to detect whether an anomalous pattern is included in a time-series recognition score that is time-series data generated using a plurality of recognition scores that are calculated respectively using a plurality of pieces of image data captured of a range within an image-capture range at mutually different time points within an image-capture time range, and indicate results of detecting objects respectively in the plurality of pieces of image data.

(Continued)

The anomalous pattern is a pattern that occurs when an adversarial sample patch attack has been conducted against at least one of the plurality of pieces of image data.

4 Claims, 6 Drawing Sheets

(58) Field of Classification Search
CPC ............ H04L 63/1408; H04L 63/1416; H04L 63/1425
See application file for complete search history.

(56) References Cited

U.S. PATENT DOCUMENTS

| | | | |
|---|---|---|---|
| 11,565,721 B2* | 1/2023 | Scharfenberger | G06V 10/764 |
| 11,681,796 B2* | 6/2023 | Tran | G06F 21/552 |
| | | | 726/22 |
| 11,727,109 B2* | 8/2023 | Speakman | G06F 21/554 |
| | | | 706/15 |
| 12,013,973 B1* | 6/2024 | Ma | G06F 21/64 |
| 12,019,747 B2* | 6/2024 | Ludwig | G06N 5/04 |
| 2014/0180980 A1 | 6/2014 | Hido et al. | |
| 2015/0356421 A1 | 12/2015 | Jones et al. | |
| 2019/0042745 A1* | 2/2019 | Chen | G06V 20/62 |
| 2022/0147620 A1 | 5/2022 | Takahashi et al. | |

FOREIGN PATENT DOCUMENTS

| | | |
|---|---|---|
| JP | 2019-113914 A | 7/2019 |
| JP | 2020-160743 A | 10/2020 |
| WO | WO 2013/014987 A1 | 1/2013 |

OTHER PUBLICATIONS

Jia et al., "Identifying and Resisting Adversarial Videos Using Temporal Consistency," 2019, 8 pages total, URL: <https://arxiv.org/abs/1909.04837v1>.

International Search Report for PCT/JP2021/022916(PCT/ISA/210) mailed on Sep. 7, 2021.

Szegedy et al., "Intriguing properties of neural networks", International Conference on Learning Representations (ICLR), arXiv:1312.6199v4 [cs:CV], Feb. 19, 2014, Total 10 pages.

Thys et al., "Fooling automated surveillance cameras: adversarial patches to attack person detection" CVPRW(Conference on Computer Vision and Pattern Recognition Workshops), IEEE(Institute of Electrical and Electronics Engineers)/CVF(Computer Vision Foundation), arXiv:1904.08653v1 [cs.CV], Apr. 18, 2019, Total 7 pages.

Xiao et al., "AdvIT: Adversarial Frames Identifier Based on Temporal Consistency in Videos", Proceedings of 2019 IEEE/CVF International Conference on Computer Vision (ICCV), Oct. 27, 2019, pp. 3967-3976, Retrieved from the Internet: <URL: https://ieeexplore.ieee.org/document/9010733> [Retrieved on Aug. 27, 2021], DOI: 10.1109/ICCV. 2019. 00407.

* cited by examiner

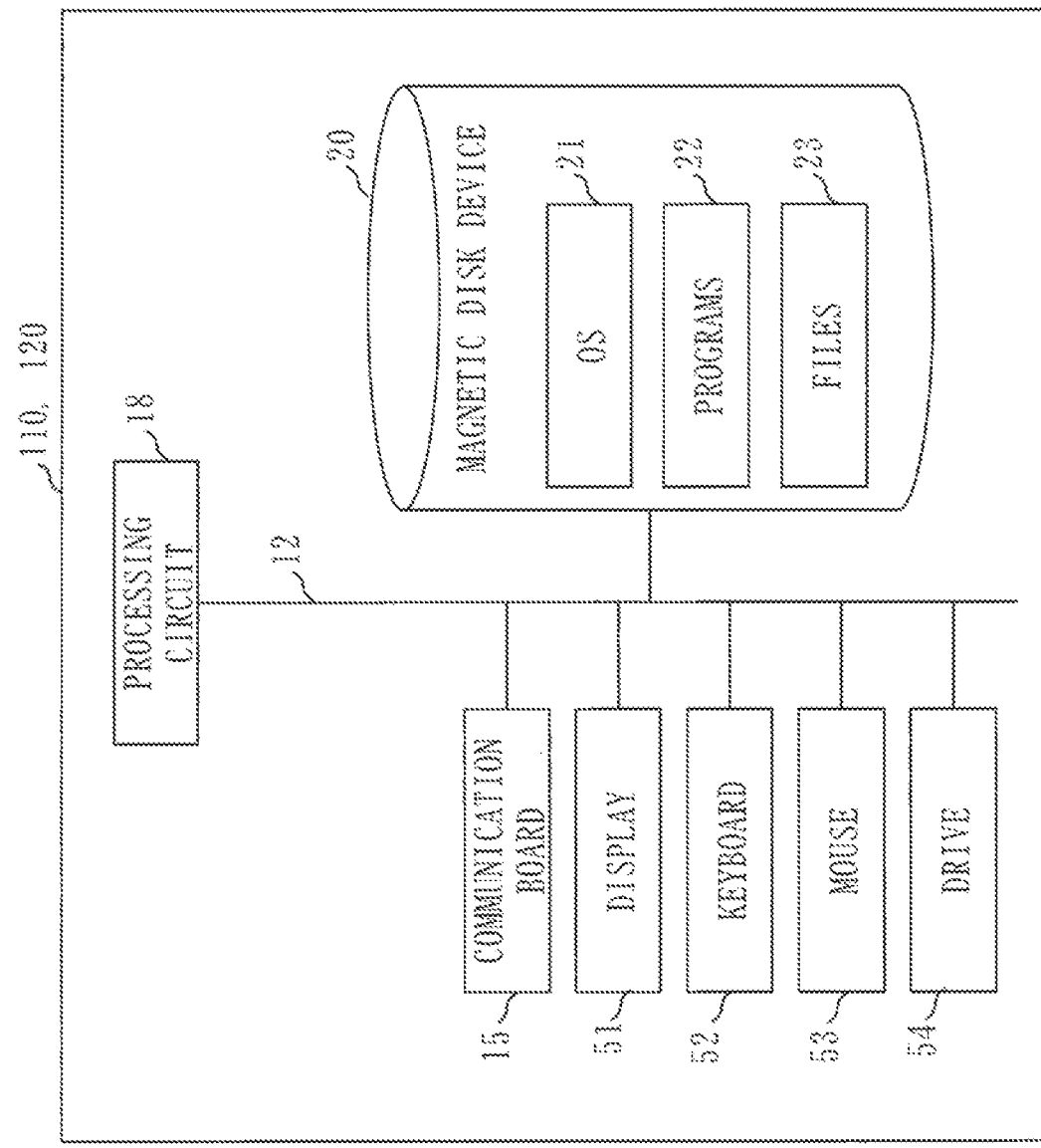

ATTACK DETECTION DEVICE, ADVERSARIAL SAMPLE PATCH DETECTION SYSTEM, ATTACK DETECTION METHOD, AND NON-TRANSITORY COMPUTER READABLE MEDIUM

CROSS REFERENCE TO RELATED APPLICATION

This application is a Continuation of PCT International Application No. PCT/JP2021/022916, filed on Jun. 16, 2021, which is hereby expressly incorporated by reference into the present application.

TECHNICAL FIELD

The present disclosure relates to an attack detection device, an adversarial sample patch detection system, an attack detection method, and an attack detection program.

BACKGROUND ART

In recent years, in object detection tasks in which the position of each object in an input image is indicated by a bounding box and the type of each object is indicated as a label, techniques of deep learning using neural networks have achieved very high accuracy. Non-Patent Literature 1 discloses a technique of an adversarial sample patch attack in which when an adversarial sample patch obtained by printing an image on which electronic transformations have been applied is physically placed and an image captured of the placed adversarial sample patch is input, detection by object detection is evaded.

CITATION LIST

Non-Patent Literature

Non-Patent Literature 1: S. Thys et al., "Fooling automated surveillance cameras: adversarial patches to attack person detection", CVPRW (Conference on Computer Vision and Pattern Recognition Workshops), IEEE (Institute of Electrical and Electronics Engineers)/CVF (Computer Vision Foundation), 2019

SUMMARY OF INVENTION

Technical Problem

According to the existing technique, a problem is that when an adversarial sample patch attack is conducted, it is difficult to detect the attack.

An object of the present disclosure is to detect an adversarial sample patch attack when the attack is conducted.

Solution to Problem

An attack detection device according to the present disclosure includes an anomalous pattern detection unit to detect whether an anomalous pattern is included in a time-series recognition score that is time-series data generated using a plurality of recognition scores calculated respectively using a plurality of pieces of image data captured of a range within an image-capture range at mutually different time points within an image-capture time range, the plurality of recognition scores indicating results of detecting objects respectively in the plurality of pieces of image data, the anomalous pattern being a pattern that occurs when an adversarial sample patch attack has been conducted against at least one of the plurality of pieces of image data.

Advantageous Effects of Invention

An attack detection device according to the present disclosure includes an anomalous pattern detection unit that detects whether a time-series recognition score composed of recognitions scores indicating results of detecting objects includes an anomalous pattern that occurs when an adversarial sample patch attack is conducted. Therefore, according to the present disclosure, when an adversarial sample patch attack is conducted, the attack can be detected.

BRIEF DESCRIPTION OF DRAWINGS

FIG. 6 is a figure illustrating an example of the hardware configuration of each of the object detection device 110 and the attack detection device 120 according to a variation of Embodiment 1.

DESCRIPTION OF EMBODIMENTS

In the description and drawings of embodiments, the same elements and corresponding elements are denoted by the same reference sign. The description of elements denoted by the same reference sign will be suitably omitted or simplified. Arrows in figures mainly indicate flows of data or flows of processing. "Unit" may be suitably interpreted as "circuit", "step". "procedure", "process", or "circuitry".

Embodiment 1

This embodiment will be described in detail below with reference to the drawings.

Description of Configuration

Figure 1:
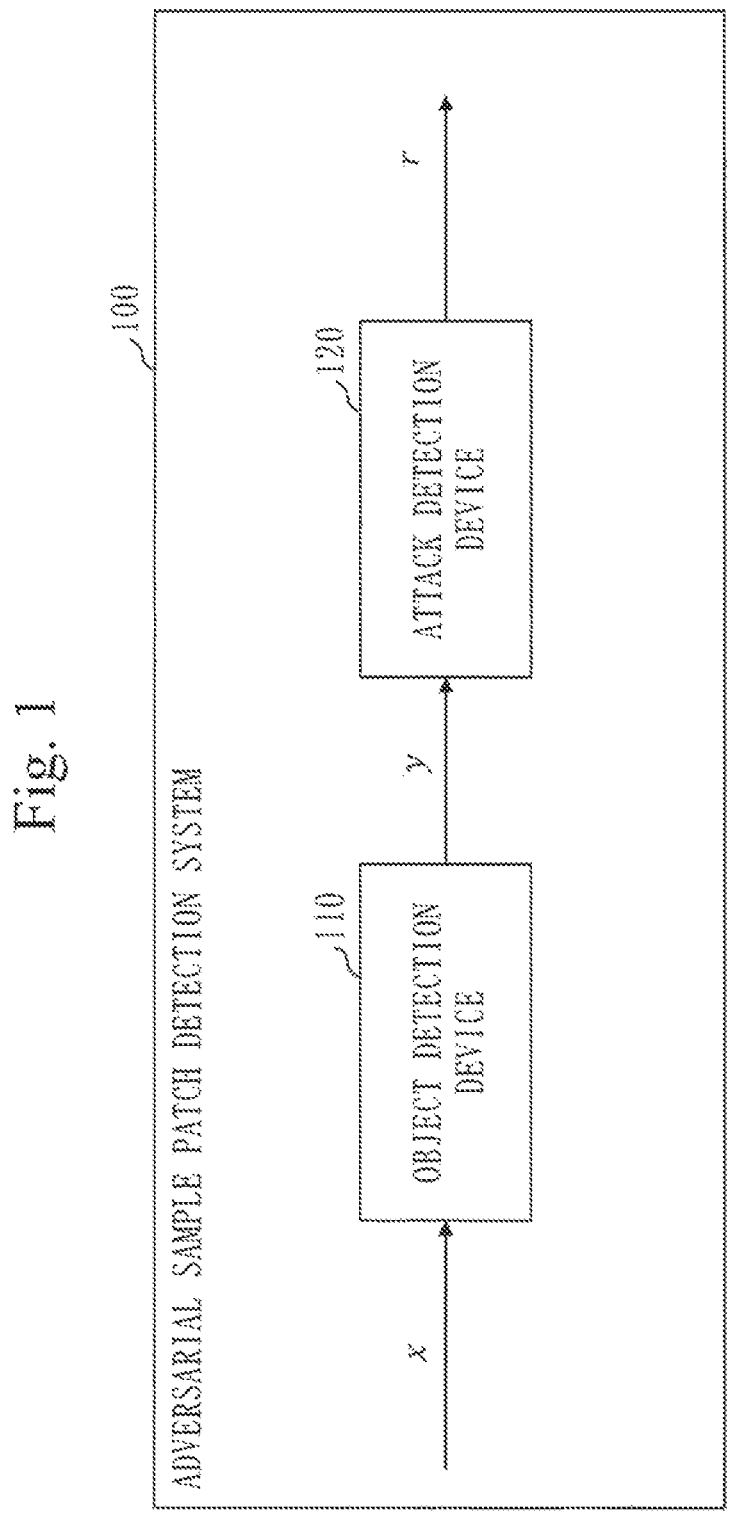
FIG. 1 is a figure illustrating an example of a system configuration of an adversarial sample patch detection system 100 according to Embodiment 1.

FIG. 1 illustrates an example of a system configuration of an adversarial sample patch detection system 100 according to this embodiment. The adversarial sample patch detection system 100 includes an object detection device 110 and an attack detection device 120. The object detection device 110 and the attack detection device 120 may be configured integrally.

The object detection device 110 receives input image data x as input, and outputs a recognition score y, which is an object detection result.

The attack detection device 120 receives the recognition score y as input, and outputs, as a detection result r of an adversarial sample patch attack, a result indicating that an adversarial sample patch attack has been detected when an anomalous pattern of a recognition score due to an adversarial sample patch attack is detected, and a result indicating that no adversarial sample patch attack has been detected in other cases. An adversarial sample patch attack is a type of adversarial sample attack, and is in particular an attack that evades object detection using a neural network or the like. The anomalous pattern is, as a specific example, a pattern in which the value of a recognition score continues to be slightly lower than an object detection threshold value for a certain period of time. That is, the anomalous pattern is a pattern that indicates that a time period in which the value of a recognition score indicated by a time-series recognition score is less than the object detection threshold value and is equal to or more than an anomaly detection threshold value continues for an anomaly detection time period or longer. An attack using an existing adversarial sample patch can reduce the value of a recognition score to be below the object detection threshold value, but cannot make the value completely 0. Therefore, this anomalous pattern is effective in detecting the attack. However, the anomalous pattern is not limited to this pattern.

Figure 2:
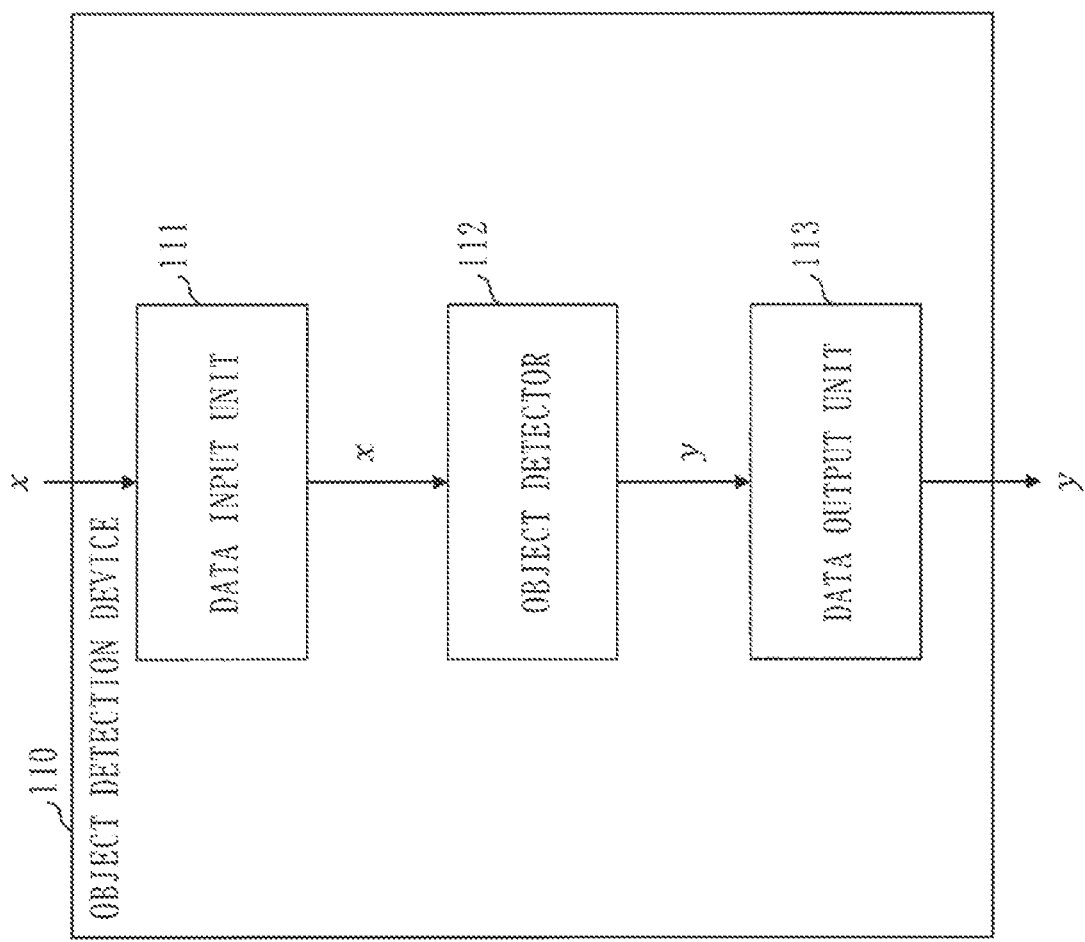
FIG. 2 is a figure illustrating an example of a functional configuration of an object detection device 110 according to Embodiment 1.

FIG. 2 illustrates an example of a functional configuration of the object detection device 110. The object detection device 110 includes a data input unit 111, an object detector 112, and a data output unit 113.

The data input unit 111 receives input image data x, which is a target of object detection, and inputs the received input image data x to the object detector 112.

The object detector 112 calculates a recognition score y using the input image data x that has been input, and outputs the calculated recognition score y to the data output unit 113. The object detector 112 is, a specific example, the object detector 112 built with a neural network. The neural network is, as a specific example, You Only Look Once (YOLO), Single Shot Multibox Detector (SSD), Faster region-based convolutional neural networks (R-CNN), or the like. The object detector 112 outputs, as a recognition score, coordinates representing the position of a bounding box corresponding to each object that appears in the input image as well as a type and a probability, which indicates a confidence level, of the object in each bounding box. The object detector 112 calculates a plurality of recognition scores respectively using a plurality of pieces of image data. The object detector 112 is also called an object detection unit.

The data output unit 113 outputs the recognition score y calculated by the object detector 112.

Figure 3:
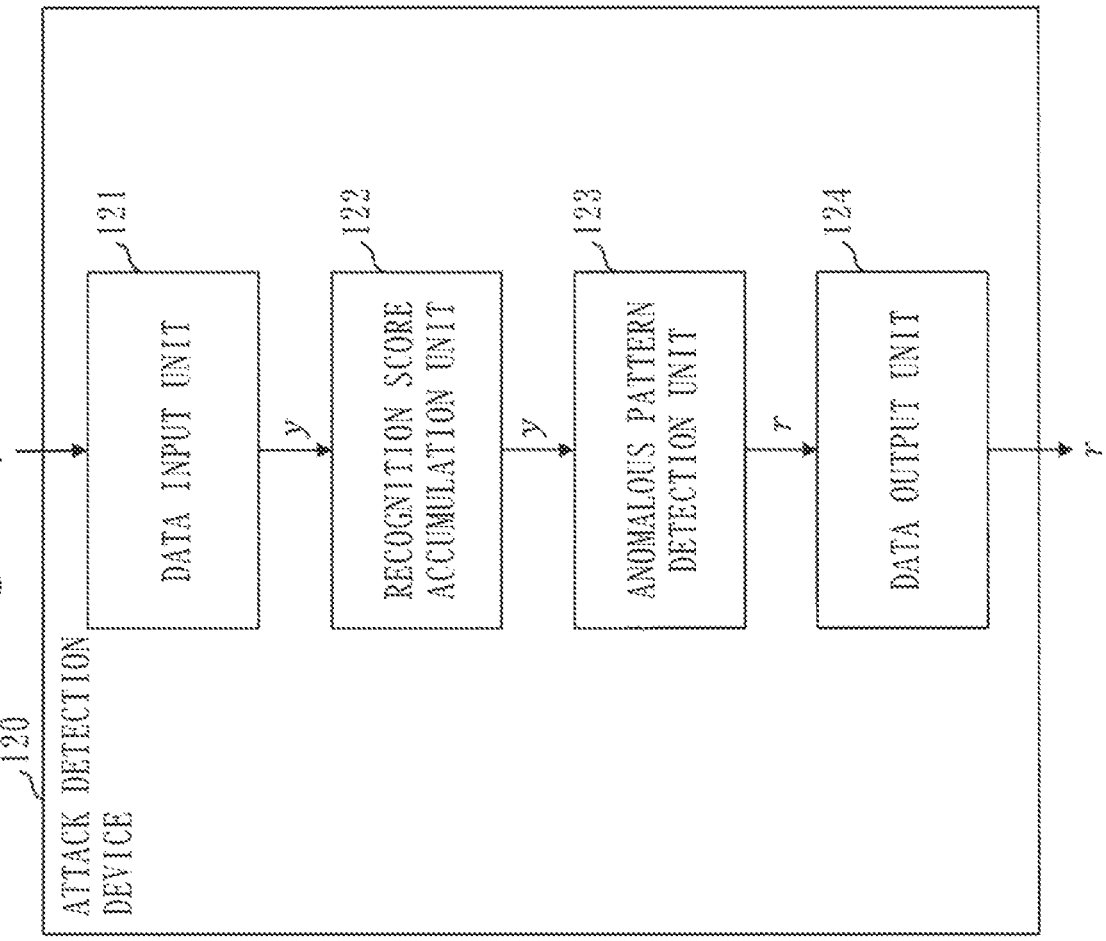
FIG. 3 is a figure illustrating an example of a functional configuration of an attack detection device 120 according to Embodiment 1.

FIG. 3 illustrates an example of a functional configuration of the attack detection device 120. The attack detection device 120 includes a data input unit 121, a recognition score accumulation unit 122, an anomalous pattern detection unit 123, and a data output unit 124.

The data input unit 121 receives the recognition score y, and inputs the received recognition score y to the recognition score accumulation unit 122.

The recognition score accumulation unit 122 adds the input recognition score y to a time-series recognition score Y' so as to generate a time-series recognition score Y, and inputs the generated time-series recognition score Y to the anomalous pattern detection unit 123. The time-series recognition score Y corresponds to the time-series recognition score Y' that has been updated. The time-series recognition score Y' is time-series data generated by accumulating recognition scores y that have been input before anew recognition score y is input. The recognition score accumulation unit 122 need not input the time-series recognition score Y to the anomalous pattern detection unit 123 each time the recognition score y is input to the recognition score accumulation unit 122, and the anomalous pattern detection unit 123 may retrieve the latest time-series recognition score Y from the recognition score accumulation unit 122 at regular intervals, and use the retrieved time-series recognition score Y A time-series recognition score is time-series data generated using a plurality of recognition scores. The plurality of recognition scores are calculated respectively using a plurality of pieces of image data captured of a range within an image-capture range at mutually different time points within an image-capture time range, and indicate results of detecting objects respectively in the plurality of pieces of image data.

The anomalous pattern detection unit 123 checks whether the time-series recognition score Y matches an anomalous pattern specified in advance. The anomalous pattern detection unit 123 inputs to the data output unit 124, as a detection result r, a result indicating detection when the time-series recognition score Y matches the anomalous pattern, or a result indicating no adversarial sample patch attack has been detected when the time-series recognition score Y does not match the anomalous pattern. The anomalous pattern detection unit 123 determines that an attack using an adversarial sample patch has been conducted when the anomalous pattern, which is a transition different from a transition of recognition scores during normal times, is detected. The anomalous pattern detection unit 123 detects whether the anomalous pattern, which occurs when an adversarial sample patch attack has been conducted against at least one of the plurality of pieces of image data, is included in the time-series recognition score.

The data output unit 124 outputs the input detection result r.

Figure 4:
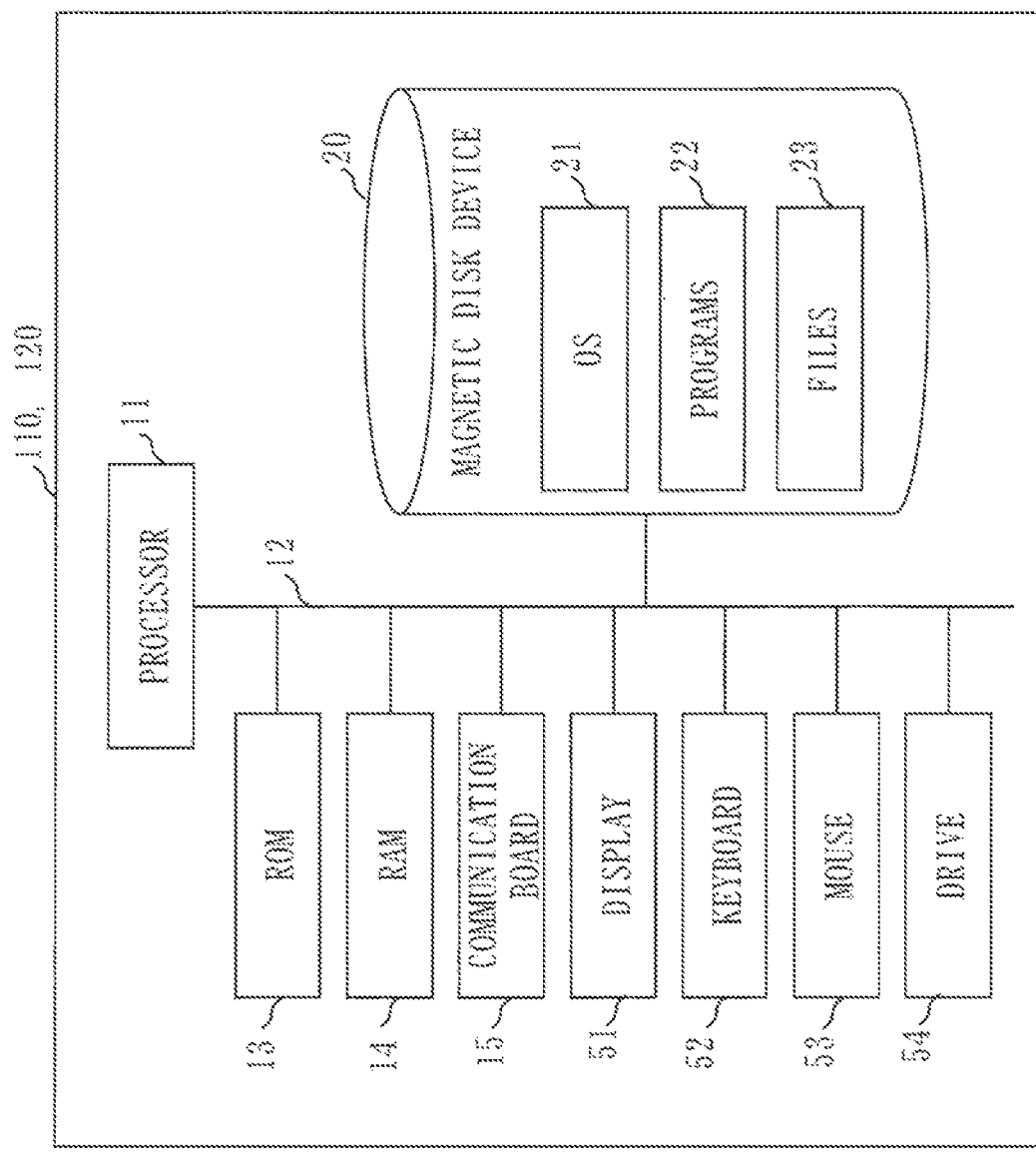
FIG. 4 is a figure illustrating an example of a hardware configuration of each of the object detection device 110 and the attack detection device 120 according to Embodiment 1.

FIG. 4 is a figure illustrating an example of hardware resources of each of the object detection device 110 and the attack detection device 120 according to this embodiment. Each of the object detection device 110 and the attack detection device 120 is composed of a computer, or may be composed of a plurality of computers.

Each of the object detection device 110 and the attack detection device 120 includes a processor 11. The processor 11 is connected, via a bus 12, with hardware devices such as a ROM 13, a RAM 14, a communication board 15, a display 51, which is a display device, a keyboard 52, a mouse 53, a drive 54, and a magnetic disk device 20, and controls these hardware devices. The processor 11 is an integrated circuit (IC) that performs operational processing and is, as a specific example, a central processing unit (CPU), a digital signal processor (DSP), or a graphics processing unit (GPU). Each of the object detection device 110 and the attack detection device 120 may include a plurality of processors. The plurality of processors share the role of the processor 11.

The drive 54 is a device that performs reading from and writing to a storage medium such as a flexible disk drive (FD), a compact disc (CD), or a digital versatile disc (DVD).

Each of the ROM 13, the RAM 14, the magnetic disk device 20, and the drive 54 is an example of a storage device. The storage device may be independent of the computer.

Each of the keyboard 52, the mouse 53, and the communication board 15 is an example of an input device. Each of the display 51 and the communication board 15 is an example of an output device.

The communication board 15 is connected, by wire or wirelessly, with a communication network such as a local area network (LAN), the Internet. or a telephone line. As a specific example, the communication board 15 is composed of a communication chip or a network interface card (NIC).

The magnetic disk device 20 stores an operating system (OS) 21, programs 22, and files 23.

The programs 22 include programs that perform functions described as each unit or each device in this embodiment. The programs are read and executed by the processor 11. That is, the programs cause a computer to function as each unit or each device, or cause a computer to perform procedures or methods of each unit or each device.

Any program described in this specification may be recorded in a computer readable non-volatile recording medium. The non-volatile recording medium is, as a specific example, an optical disc or a flash memory. Any program described in this specification may be provided as a program product.

The files 23 include various types of data used in each unit or each device described in this embodiment.

Description of Operation

A procedure for operation of the object detection device 110 is equivalent to an object detection method. A program that realizes the operation of the object detection device 110 is equivalent to an object detection program. A procedure for operation of the attack detection device 120 is equivalent to an attack detection method. A program that realizes the operation of the attack detection device 120 is equivalent to an attack detection program.

Figure 5:
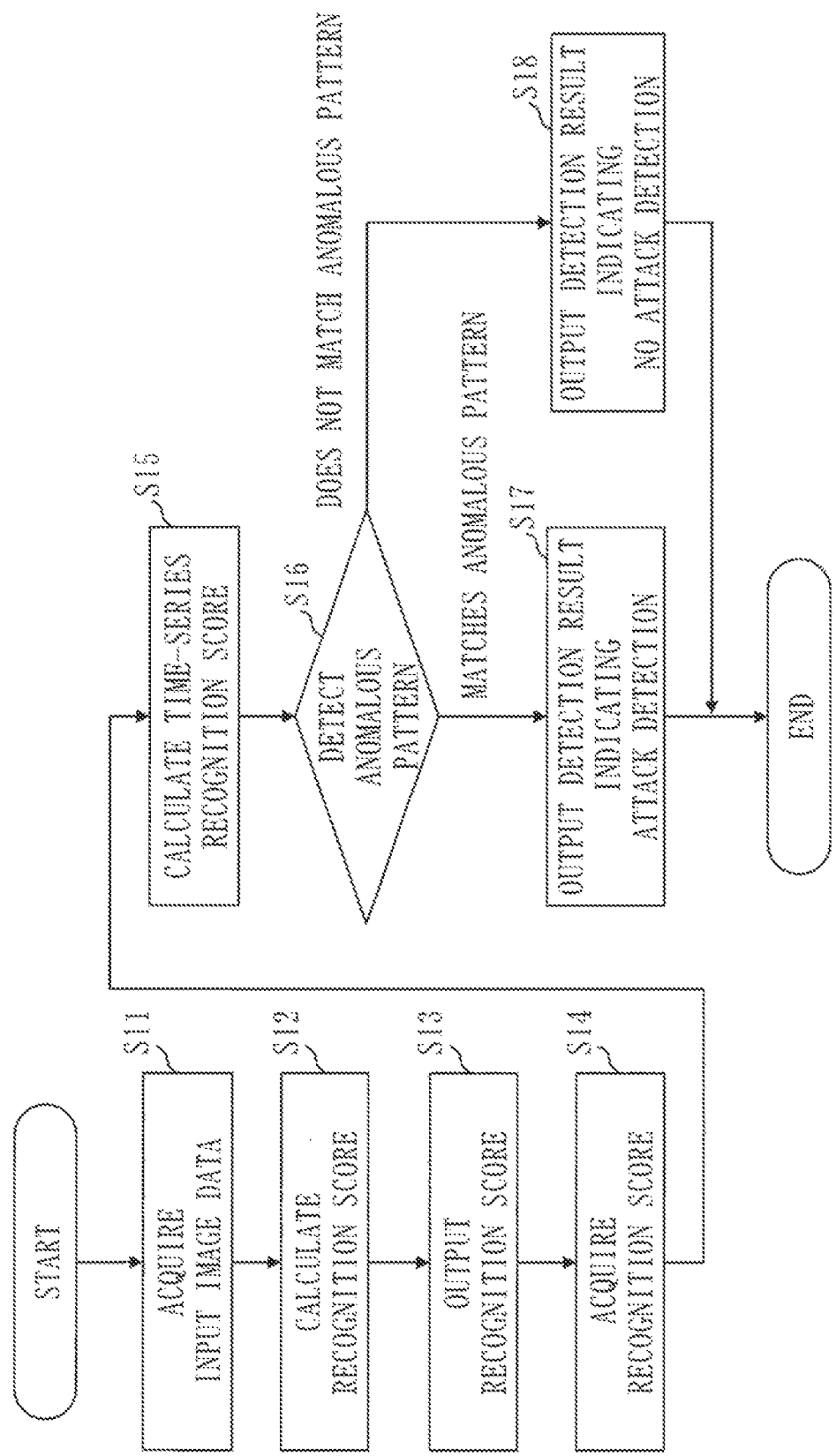
FIG. 5 is a flowchart illustrating operation of the adversarial sample patch detection system 100 according to Embodiment 1.

FIG. 5 is a flowchart illustrating an example of processing of the adversarial sample patch detection system 100 according to this embodiment. Referring to this figure, the processing of the adversarial sample patch detection system 100 will be described.

(Step S11)

The data input unit 111 receives input image data x, and inputs the received input image data x to the object detector 112.

(Step S12)

The object detector 112 calculates a recognition score y using the input image data x that has been input.

(Step S13)

The data output unit 113 outputs the calculated recognition score y.

(Step S14)

The data input unit 121 receives the recognition score y, and inputs the received recognition score y to the recognition score accumulation unit 122.

(Step S15)

The recognition score accumulation unit 122 adds the input recognition score y to a time-series recognition score Y' so as to update the time-series recognition score Y' to a time-series recognition score Y, and inputs the updated time-series recognition score Y to the anomalous pattern detection unit 123.

(Step S16)

The anomalous pattern detection unit 123 determines whether the input time-series recognition score Y matches an anomalous pattern specified in advance.

If the anomalous pattern matches the time-series recognition score Y, the attack detection device 120 proceeds to step S17. In other cases, the attack detection device 120 proceeds to step S18.

(Step S17)

The data output unit 124 outputs, as a detection result r, a result indicating that an adversarial sample patch attack has been detected.

(Step S18)

The data output unit 124 outputs, as a detection result r, a result indicating that no adversarial sample patch attack has been detected.

Description of Effects of Embodiment 1

As described above, according to this embodiment, an adversarial sample patch attack can be detected by determining whether a time-series recognition score matches an anomalous pattern.

Other Configurations

<Variation 1>

FIG. 6 illustrates an example of the hardware configuration of each of the object detection device 110 and the attack detection device 120 according to this variation.

Each of the object detection device 110 and the attack detection device 120 includes a processing circuit 18 in place of the processor 11, in place of the processor 11 and the ROM 13, in place of the processor 11 and the RAM 14, or in place of the processor 11, the ROM 13, and the RAM 14.

The processing circuit 18 is hardware that realizes at least part of the units included in each of the object detection device 110 and the attack detection device 120.

The processing circuit 18 may be dedicated hardware, or may be a processor that executes programs stored in the magnetic disk device 20.

When the processing circuit 18 is dedicated hardware, the processing circuit 18 is, as a specific example, a single circuit, a composite circuit, a programmed processor, a parallel-programmed processor, an application specific integrated circuit (ASIC), a field programmable gate array (FPGA), or a combination of these.

Each of the object detection device 110 and the attack detection device 120 may include a plurality of processing circuits as an alternative to the processing circuit 18. The plurality of processing circuits share the role of the processing circuit 18.

In each of the object detection device 110 and the attack detection device 120, some functions may be realized by dedicated hardware, and the remaining functions may be realized by software or firmware.

As a specific example, the processing circuit 18 is realized by hardware, software, firmware, or a combination of these.

The processor 11, the ROM 13, the RAM 14, and the processing circuit 18 are collectively called "processing circuitry". That is, the functions of the functional components of each of the object detection device 110 and the attack detection device 120 are realized by the processing circuitry.

Other Embodiments

Embodiment 1 has been described, and portions of this embodiment may be implemented in combination. Alternatively, this embodiment may be partially implemented. Alternatively, this embodiment may be modified in various ways as necessary, and may be implemented as a w % bole or partially in any combination. What is described as each unit or each device may be implemented by firmware, software, hardware, or a combination of these.

The embodiment described above is an essentially preferable example, and is not intended to limit the present disclosure as well as the applications and scope of uses of the present disclosure. The procedures described using the flowcharts or the like may be modified as appropriate.

REFERENCE SIGNS LIST

11: processor, 12: bus, 13: ROM, 14: RAM, 15: communication board, 18: processing circuit, 20: magnetic disk device, 21: OS, 22: programs, 23: files, 51: display, 52: keyboard, 53: mouse, 54: drive, 100: adversarial sample patch detection system, 110: object detection device, 111: data input unit, 112: object detector, 113: data output unit, 120: attack detection device, 121: data input unit, 122: recognition score accumulation unit, 123: anomalous pattern detection unit, 124: data output unit.

The invention claimed is:

1. An attack detection device comprising:

processing circuitry to detect whether an anomalous pattern is included in a time-series recognition score that is time-series data generated using a plurality of recognition scores calculated respectively using a plurality of pieces of image data captured of a range within an image-capture range at mutually different time points within an image-capture time range, the plurality of recognition scores indicating results of detecting objects respectively in the plurality of pieces of image data, the anomalous pattern being a pattern that occurs when an adversarial sample patch attack has been conducted against at least one of the plurality of pieces of image data, wherein the anomalous pattern is a pattern that indicates that a time period in which a value of a recognition score indicated by the time-series recognition score is less than an object detection threshold value and equal to or more than an anomaly detection threshold value continues for an anomaly detection time period or longer.

2. An adversarial sample patch detection system comprising:

the attack detection device according to claim 1; and an object detection device including an object detector that calculates the plurality of recognition scores respectively using the plurality of pieces of image data.

3. An attack detection method comprising:

detecting whether an anomalous pattern is included in a time-series recognition score that is time-series data generated using a plurality of recognition scores calculated respectively using a plurality of pieces of image data captured of a range within an image-capture range at mutually different time points within an image-capture time range, the plurality of recognition scores indicating results of detecting objects respectively in the plurality of pieces of image data, the anomalous pattern being a pattern that occurs when an adversarial sample patch attack has been conducted against at least one of the plurality of pieces of image data, wherein the anomalous pattern is a pattern that indicates that a time period in which a value of a recognition score indicated by the time-series recognition score is less than an object detection threshold value and equal to or more than an anomaly detection threshold value continues for an anomaly detection time period or longer.

4. A non-transitory computer readable medium storing an attack detection program that causes an attack detection device, which is a computer, to execute;

an anomalous pattern detection process of detecting whether an anomalous pattern is included in a time-series recognition score that is time-series data generated using a plurality of recognition scores calculated respectively using a plurality of pieces of image data captured of a range within an image-capture range at mutually different time points within an image-capture time range, the plurality of recognition scores indicating results of detecting objects respectively in the plurality of pieces of image data, the anomalous pattern being a pattern that occurs when an adversarial sample patch attack has been conducted against at least one of the plurality of pieces of image data, wherein the anomalous pattern is a pattern that indicates that a time period in which a value of a recognition score indicated by the time-series recognition score is less than an object detection threshold value and equal to or more than an anomaly detection threshold value continues for an anomaly detection time period or longer.

* * * * *